Jan. 16, 1923. 1,442,367.
A. STEVENS.
MEANS FOR TREATING TREES TO RETARD THE FLOW OF SAP THEREIN.
FILED SEPT. 4, 1920.
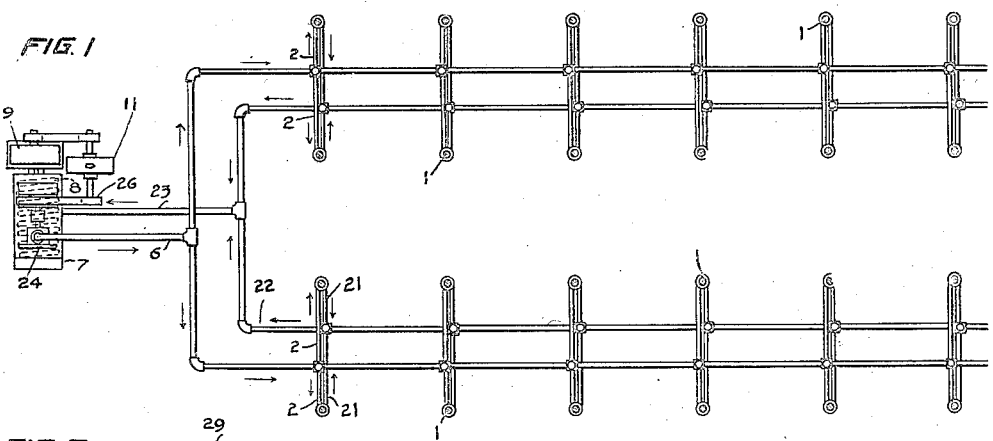
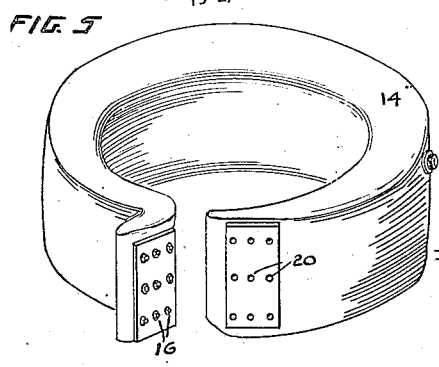
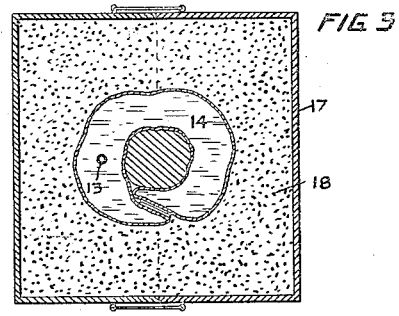
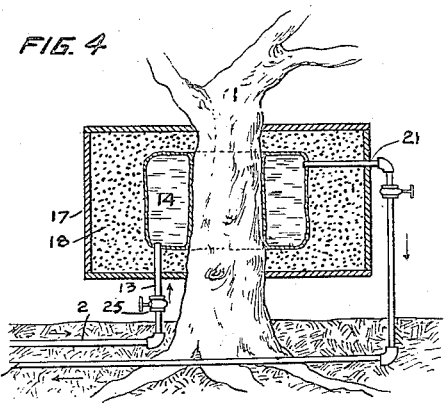
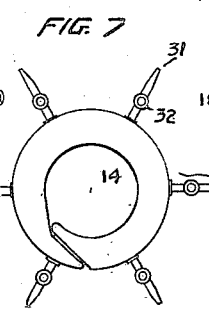
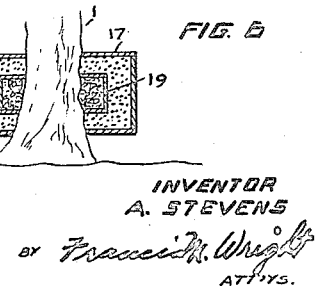
INVENTOR
A. STEVENS
BY Francis M. Wright
ATTYS.

Patented Jan. 16, 1923.

1,442,367

UNITED STATES PATENT OFFICE.

ARTHUR STEVENS, OF BENICIA, CALIFORNIA.

MEANS FOR TREATING TREES TO RETARD THE FLOW OF SAP THEREIN.

Application filed September 4, 1920. Serial No. 408,177.

*To all whom it may concern:*

Be it known that I, ARTHUR STEVENS, a citizen of the United States, residing at Benicia, in the county of Solano and State of California, have invented new and useful Improvements in Means for Treating Trees to Retard the Flow of Sap Therein, of which the following is a specification.

One object of the present invention is to provide an improved method and apparatus for preventing injury by late frosts to fruit and other trees, vines, and the like.

A further object is to provide an apparatus which can not only, when required, be used to prevent such losses, but can also be used to promote the growth of the trees, to destroy insects by which they are liable to be attacked, and to irrigate the soil from which the trees grow.

In the accompanying drawings, Figure 1 is a plan view illustrating my improved process and apparatus as applied to an orchard; Figure 2 is an elevation of a portion of the apparatus which is applied to a tree; Figure 3 is an enlarged cross section on the line 3—3 of Figure 2; Figure 4 is an enlarged vertical section of the apparatus applied to a tree; Figure 5 is a perspective view of a flexible container; Figure 6 is a view similar to Figure 4 showing ice as a refrigerating medium; Figure 7 is a view similar to Figure 3 of the device as used for irrigation.

Losses occurring in the fruit of fruit and other trees or vines caused by late frosts are due to the fact that, by warm weather preceding said frosts, the sap is caused to rise in the trees, thus causing its premature blossoming.

My improved process consists in retarding the rising of the sap in the tree until the danger from late frosts is completely passed.

Specifically my improved process consists in sufficiently cooling a portion of suitable extent of the trunk of a tree between the root and the branches so as to cool the channel for the sap between the trunk and the bark of the tree, thereby retarding the sap from flowing through the cooled portion of the channel.

I attain this result by surrounding the trunk of the tree with a chamber through which is circulated the cooling medium.

The apparatus for carrying out the above process is shown in the drawings, in which 1 indicates trees of an orchard in rows. Lateral supply pipes 2 are laid in the ground at a depth such that they would not interfere with the operation of ploughing between the trees. Said pipes 2 are connected to a supply pipe 6 leading from a tank 7 for containing the cooling medium. In said tank is a refrigerating coil 8 for containing a refrigerating medium, such as ammonia, leading from a compressor 9 operated by a suitable motor 11. From each lateral pipe 2 extends upwardly a pipe 13 which enters a flexible container 14, preferably of rubber, adapted to be placed around the trunk of a tree. Said container is contained in a box 17 filled with insulating substance 18. Pins 16 extending from a plate secured to the inner side of one end of the container enter eyes 20 formed in a plate upon the outer side of the other end of the container at the other end and secure the two ends together. From an outer portion of the container extends a pipe 21 which is connected by a return lateral pipe 22 located in the ground at about the same depth as the supply lateral pipe. Said return lateral pipes are connected to a return header 23 which is connected with the tank 7 for the cooling medium.

A pump 24 operated by the same motor 11 by means of a belt 26 forces the cooling medium through the system of pipes.

In order to ensure that the rapidity of the circulation through the containers around the different trees may be as uniform as possible, I provide valves 25, which control the circulation through the several pipes 13. By suitable manipulation of said valves, the passages therethrough can be regulated so that the cooling medium can circulate with substantially equal rapidity through the containers, whatever be their distance from the point of supply.

In the form of the invention shown in Figure 6, instead of a container 14, there is employed a container 19 which is filled with ice.

It will be seen that, with this apparatus, the constant circulation of a cooling medium, such as brine, can be maintained around each tree of the orchard, cooling the bark and the sap channel thereunder, and retarding the rising of the sap in said channel until such time as the orchardist may deem it wise to permit the sap to ascend in the tree.

The same apparatus, with a slight addition, can afterwards be used for spraying the tree and killing insects which attack it. For this purpose, there is connected to each pipe 13 an upward extension 27, which enters a vessel containing an insecticide, and in said vessel it discharges into the flaring lower end of a pipe 28 extending upwardly to a height above the top of the trees. A spreader 29 is supported by said pipe and is located above its upper end and is directed downwardly. When the proper time arrives the orchardist discontinues the use of water or other fluid and in place thereof causes compressed air to flow through the inlet pipe and into said vessel. The compressed air acts as an injector to carry up with it the insecticide which is discharged against the spreader and is sprayed thereby over the whole tree.

This apparatus may also be used for irrigating the orchard. For this purpose, the containers are provided each with a circular series of nozzles 31 having valves 32. When it is desired to use the pipes for irrigation the valves 32 are opened and at suitable intervals of time water is forced through the supply pipes, entering said containers and flowing out through said nozzles. This enables the orchard to be irrigated with comparatively small amounts of water at frequent intervals, a method more beneficial to the tree than the one at present in use where the soil is irrigated with large amounts of water at long intervals.

I claim:

1. Means for treating a tree to retard the flow of sap therein comprising a container adapted to be placed upon the trunk of a tree and a cooling medium within the container.

2. Means for treating a tree to retard the flow of sap therein comprising a container adapted to be placed upon the trunk of a tree, a cooling medium within the container and means for holding the container upon the tree.

3. Apparatus for treating a tree comprising means for applying a cooling medium to the trunk of the tree arranged so as to cool from the exterior a portion of the trunk of the tree.

4. Means for treating a tree to retard the flow of sap therein comprising a container be placed upon the trunk of a tree and means for supplying a cooling medium to the container.

5. Means for treating a tree to retard the flow of sap therein comprising apparatus for circulating about the trunk of a tree a cooling medium.

6. Means for treating a tree to retard the flow of sap therein comprising a container adapted to be placed in contact with the trunk of a tree, means for thermo-insulating the portion of the container not in contact with the tree and means for supplying to and withdrawing from the container a cooling medium.

7. Means of treating a tree to retard the flow of sap therein comprising a flexible container adapted to be placed in contact with the trunk of a tree and a cooling medium in the container.

8. Means for treating a tree comprising a container adapted to substantially encircle and contact with the trunk of a tree and a cooling medium within the container.

ARTHUR STEVENS.